United States Patent
Vasseur et al.

(10) Patent No.: US 11,240,153 B1
(45) Date of Patent: Feb. 1, 2022

(54) SCORING POLICIES FOR PREDICTIVE ROUTING SUGGESTIONS

(71) Applicant: Cisco Technology, Inc., San José, CA (US)

(72) Inventors: Jean-Philippe Vasseur, Saint Martin D'uriage (FR); Grégory Mermoud, Venthône (CH); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/944,334

(22) Filed: Jul. 31, 2020

(51) Int. Cl.
*H04L 12/715* (2013.01)
*H04L 12/24* (2006.01)
*H04L 12/751* (2013.01)

(52) U.S. Cl.
CPC .......... *H04L 45/64* (2013.01); *H04L 41/147* (2013.01); *H04L 41/5019* (2013.01); *H04L 45/02* (2013.01)

(58) Field of Classification Search
CPC ..... H04L 45/64; H04L 41/47; H04L 41/5019; H04L 45/02
USPC ........................................................ 370/401
See application file for complete search history.

(56) References Cited

U.S. PATENT DOCUMENTS

| | | | | |
|---|---|---|---|---|
| 8,079,089 B2* | 12/2011 | Kakehi | ............... | G06F 21/10 726/26 |
| 8,843,997 B1* | 9/2014 | Hare | ............... | H04L 63/0815 726/3 |
| 9,906,401 B1* | 2/2018 | Rao | ............... | H04L 47/24 |
| 10,528,914 B2* | 1/2020 | Richardson | ............. | H04L 51/34 |
| 10,999,188 B1* | 5/2021 | Cafarelli | ............... | H04L 43/04 |
| 2004/0243699 A1* | 12/2004 | Koclanes | ............ | H04L 41/0893 709/224 |
| 2008/0320550 A1* | 12/2008 | Strassner | ............ | H04L 63/0263 726/1 |
| 2010/0037304 A1* | 2/2010 | Canning | ............. | G06F 21/6218 726/7 |
| 2010/0071024 A1* | 3/2010 | Eyada | ................ | H04L 63/1458 726/1 |

(Continued)

FOREIGN PATENT DOCUMENTS

WO 2015106795 7/2015

OTHER PUBLICATIONS

"Configure Profile Business Policy", online: https://docs.vmware.com/en/VMware-SD-WAN-by-VeloCloud/3.3/velocloud-admin-guide-33/GUID-7091C429-5A9A-4769-8D4F-D7EB434E4F5F.html, Oct. 2019, 2 pages, VMware, Inc.

(Continued)

Primary Examiner — Anthony Mejia
(74) Attorney, Agent, or Firm — Behmke Innovation Group LLC; Kenneth J. Heywood; Jonathon P. Western

(57) ABSTRACT

In one embodiment, a device makes a determination that a first predictive routing policy generated by a predictive routing engine for a network would have performed better than a preexisting routing policy that is active in the network. The device adjusts, based on the determination, a level of trust associated with the predictive routing engine. The device obtains information regarding a second predictive routing policy generated by the predictive routing engine for the network. The device activates the second predictive routing policy in the network, based on the level of trust associated with the predictive routing engine.

20 Claims, 10 Drawing Sheets

(56) References Cited

U.S. PATENT DOCUMENTS

| | | | | |
|---|---|---|---|---|
| 2010/0114554 | A1* | 5/2010 | Misra | G06Q 10/00 |
| | | | | 703/22 |
| 2010/0169067 | A1* | 7/2010 | Basel | G06F 13/10 |
| | | | | 703/21 |
| 2011/0154497 | A1* | 6/2011 | Bailey, Jr. | G06F 21/554 |
| | | | | 726/25 |
| 2011/0209215 | A1* | 8/2011 | Kabbara | H04L 63/105 |
| | | | | 726/22 |
| 2012/0079559 | A1* | 3/2012 | Reznik | H04W 12/086 |
| | | | | 726/1 |
| 2012/0278464 | A1* | 11/2012 | Lehane | H04W 4/20 |
| | | | | 709/223 |
| 2013/0111547 | A1* | 5/2013 | Kraemer | G06F 21/56 |
| | | | | 726/1 |
| 2014/0215580 | A1* | 7/2014 | Behringer | H04L 63/20 |
| | | | | 726/5 |
| 2015/0296368 | A1* | 10/2015 | Kaufman | H04L 41/0873 |
| | | | | 455/418 |
| 2016/0182329 | A1* | 6/2016 | Armolavicius | H04L 41/0893 |
| | | | | 370/230 |
| 2016/0218963 | A1 | 7/2016 | Nauck et al. | |
| 2016/0234099 | A1* | 8/2016 | Jiao | H04L 47/2441 |
| 2016/0294691 | A1* | 10/2016 | Joshi | H04L 41/0893 |
| 2016/0359672 | A1* | 12/2016 | Blair | H04L 41/5019 |
| 2016/0359917 | A1* | 12/2016 | Rao | H04L 43/0805 |
| 2017/0026417 | A1* | 1/2017 | Ermagan | H04L 63/0272 |
| 2018/0034922 | A1* | 2/2018 | Gopalan | G06N 20/00 |
| 2019/0036842 | A1* | 1/2019 | Aranha | H04L 45/50 |
| 2019/0121672 | A1 | 4/2019 | Ding et al. | |
| 2019/0138936 | A1 | 5/2019 | Vasseur et al. | |
| 2019/0334820 | A1* | 10/2019 | Zhao | H04L 47/12 |
| 2019/0386918 | A1* | 12/2019 | Iyer | H04L 41/12 |
| 2020/0007381 | A1 | 1/2020 | Nucci et al. | |
| 2020/0358692 | A1* | 11/2020 | Wang | H04L 45/04 |
| 2021/0243133 | A1* | 8/2021 | Tourrilhes | H04L 47/25 |

OTHER PUBLICATIONS

De Berg, et al., "Interval trees," Computational Geometry, vol. 3rd edn., Section 10.1, Jan. 2008, p. 220-226, Springer-Verlag Berlin Heidelererg.

"Cisco SD-WAN: Policy Overview", online: https://sdwan-docs.cisco.com/Product_Documentation/Software_Features/Release_18.2/06Policy_Basics/01Policy_Overview, Mar. 2018, 8 pages, Cisco Systems, Inc.

* cited by examiner

SCORING POLICIES FOR PREDICTIVE ROUTING SUGGESTIONS

TECHNICAL FIELD

The present disclosure relates generally to computer networks, and, more particularly, to scoring policies for predictive routing suggestions.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs.

Failure detection in a network has traditionally been reactive, meaning that the failure must first be detected before rerouting the traffic along a secondary (backup) path. In general, failure detection leverages either explicit signaling from the lower network layers or using a keep-alive mechanism that sends probes at some interval T that must be acknowledged by a receiver (e.g., a tunnel tail-end router). Typically, SD-WAN implementations leverage the keep-alive mechanisms of Bidirectional Forwarding Detection (BFD), to detect tunnel failures and to initiate rerouting the traffic onto a backup (secondary) tunnel, if such a tunnel exits. While this approach is somewhat effective at mitigating tunnel failures in an SD-WAN, reactive failure detection is also predicated on a failure first occurring. This means that traffic will be affected by the failure, until the traffic is moved to another tunnel.

With the recent evolution of machine learning, predictive failure detection and proactive routing in an SD-WAN now becomes possible through the use of machine learning techniques. However, use of such techniques can also lead to multiple policies being configured that need to be enforced, some of which may only be active during certain times. Left unchecked, this type of dynamic policy creation and enforcement can become unmanageable, inconsistent, and unstable.

DESCRIPTION OF EXAMPLE EMBODIMENTS

Overview

Figure 1A:
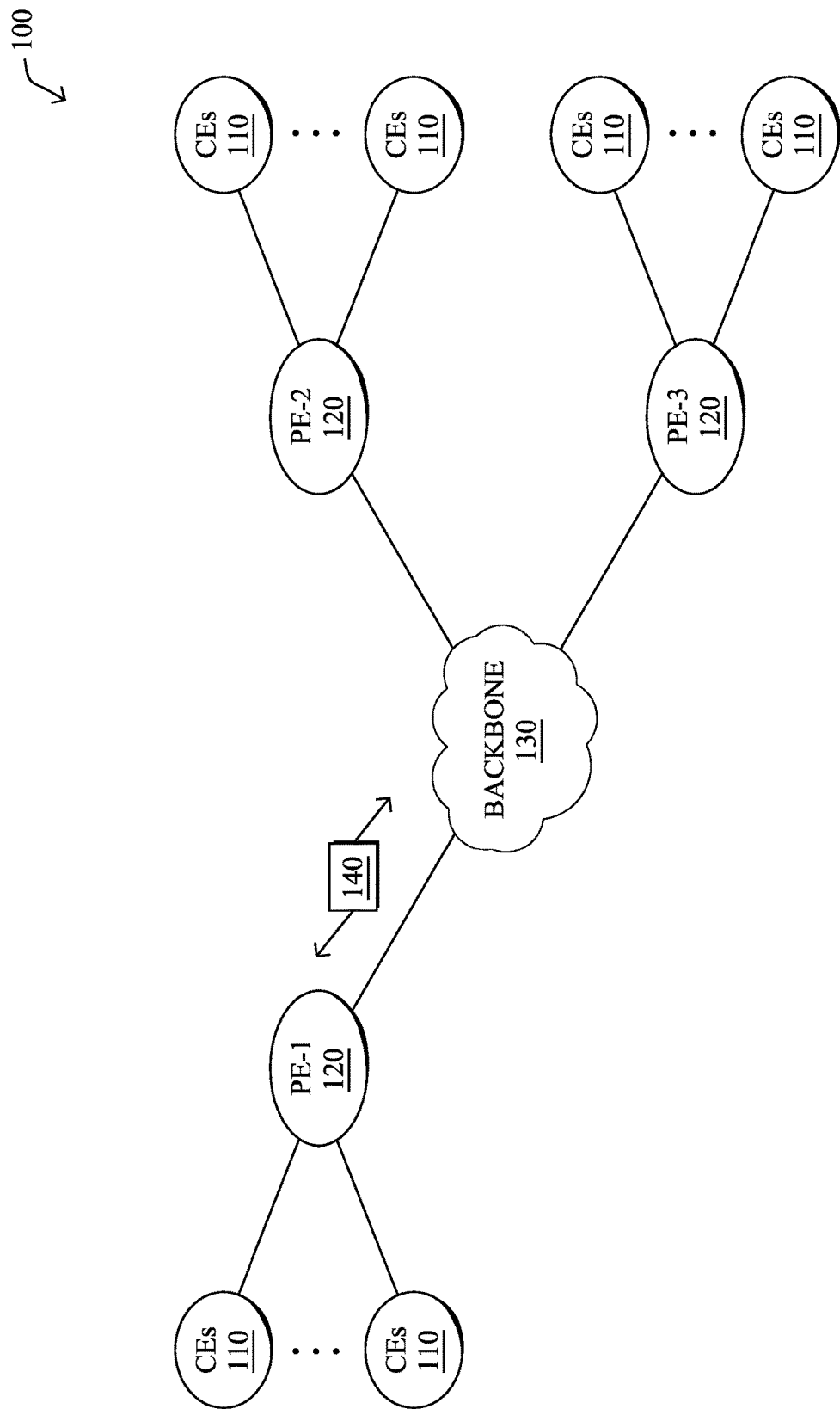
FIGS. 1A-1B illustrate an example communication network.

According to one or more embodiments of the disclosure, a device makes a determination that a first predictive routing policy generated by a predictive routing engine for a network would have performed better than a preexisting routing policy that is active in the network. The device adjusts, based on the determination, a level of trust associated with the predictive routing engine. The device obtains information regarding a second predictive routing policy generated by the predictive routing engine for the network. The device activates the second predictive routing policy in the network, based on the level of trust associated with the predictive routing engine.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
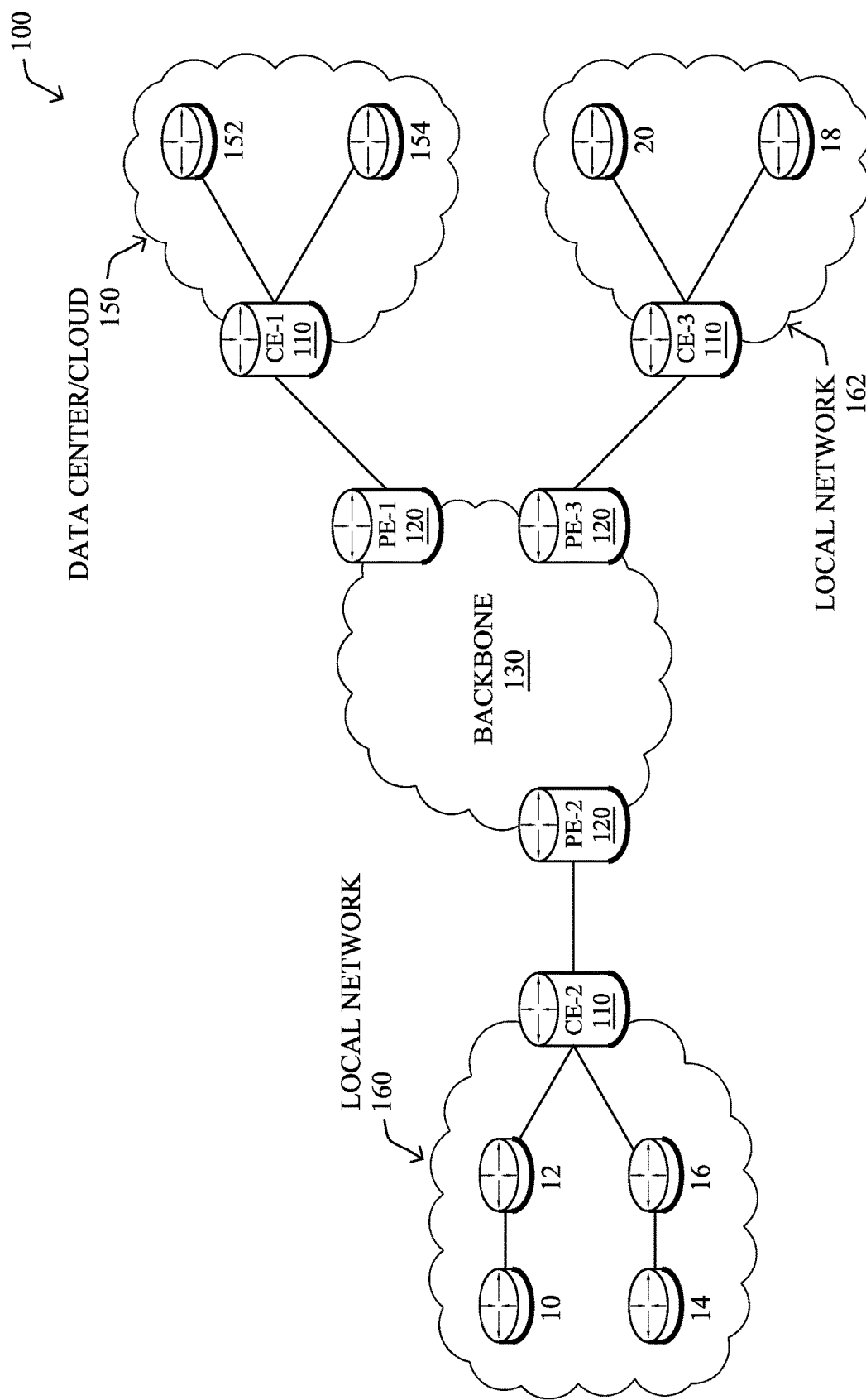

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
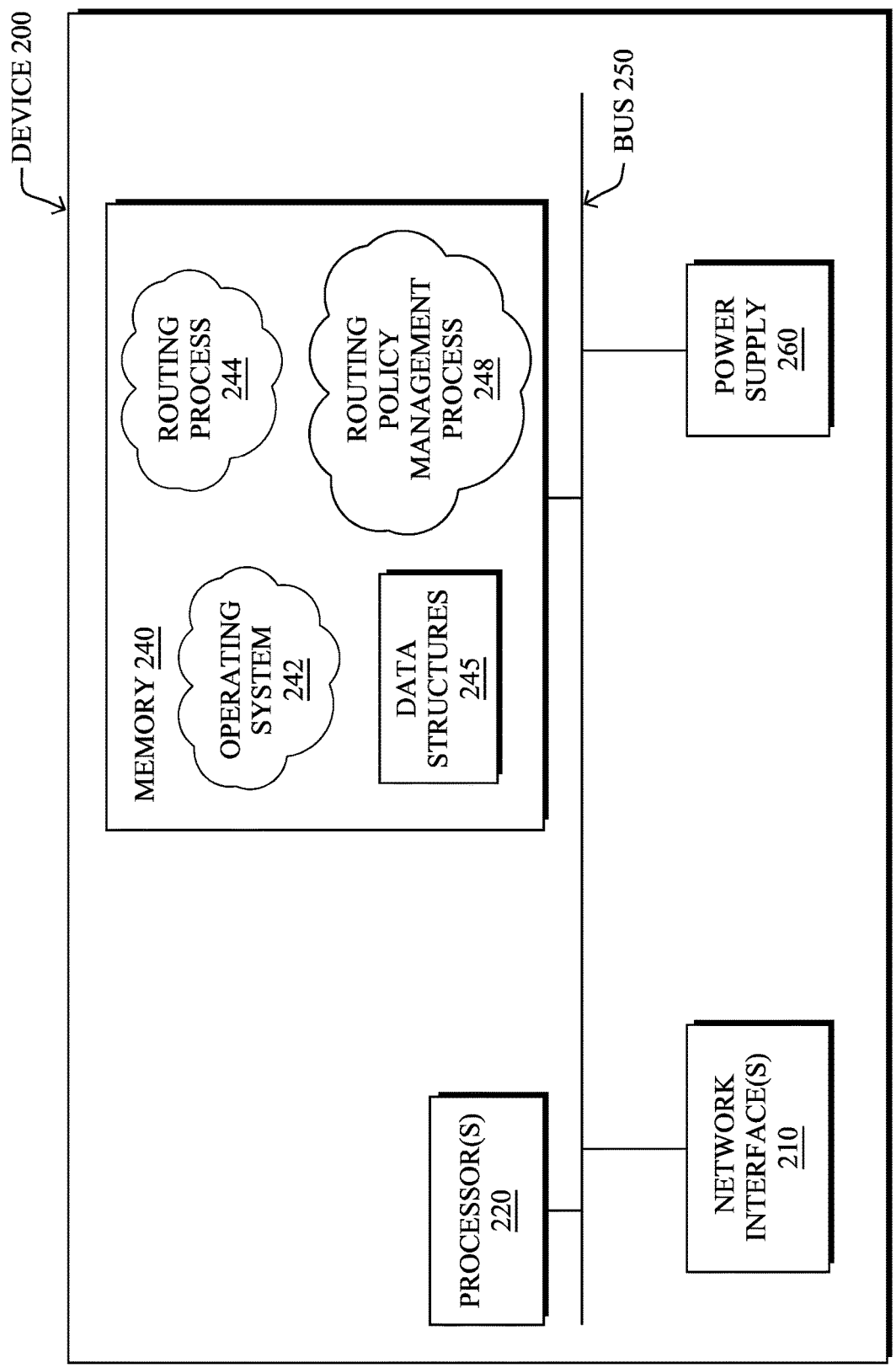
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and/or a routing policy management process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 244 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 244 and/or routing policy management process 248 may also include computer executable instructions that, when executed by processor(s) 220, cause device 200 to perform the techniques described herein. To do so, in some embodiments, SaaS performance evaluation process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 244 and/or routing policy management process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 244 and/or routing policy management process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that conditions in the network will result in an unacceptable quality of experience (QoE) associated with an application. Conversely, the false negatives of the model may refer to the number of times the model incorrectly predicted an acceptable QoE. True negatives and positives may refer to the number of times the model correctly predicted whether the QoE will be acceptable or unacceptable, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different quality of service (QoS) at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
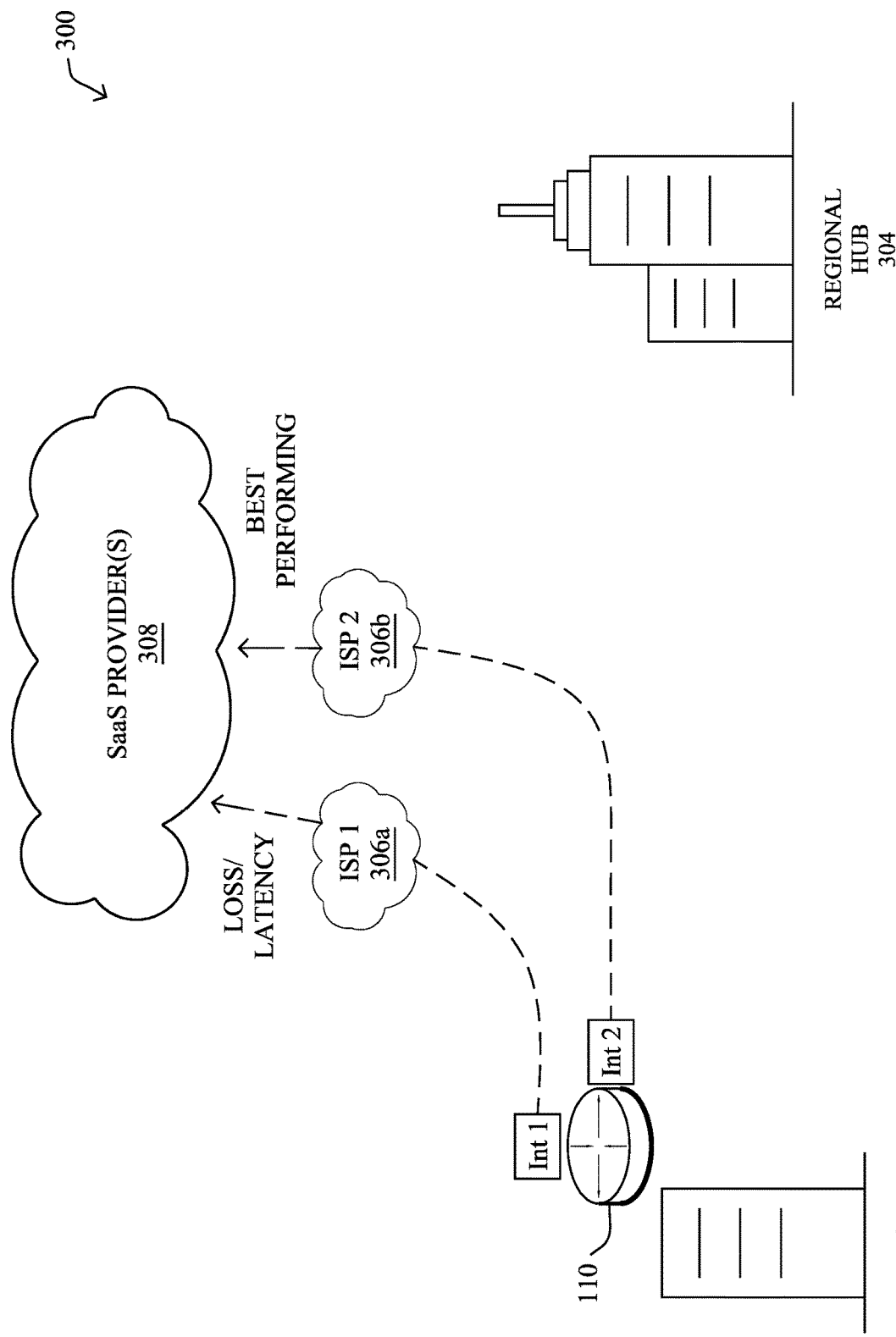
FIGS. 3A-3B illustrate example network deployments.
Figure 3B:
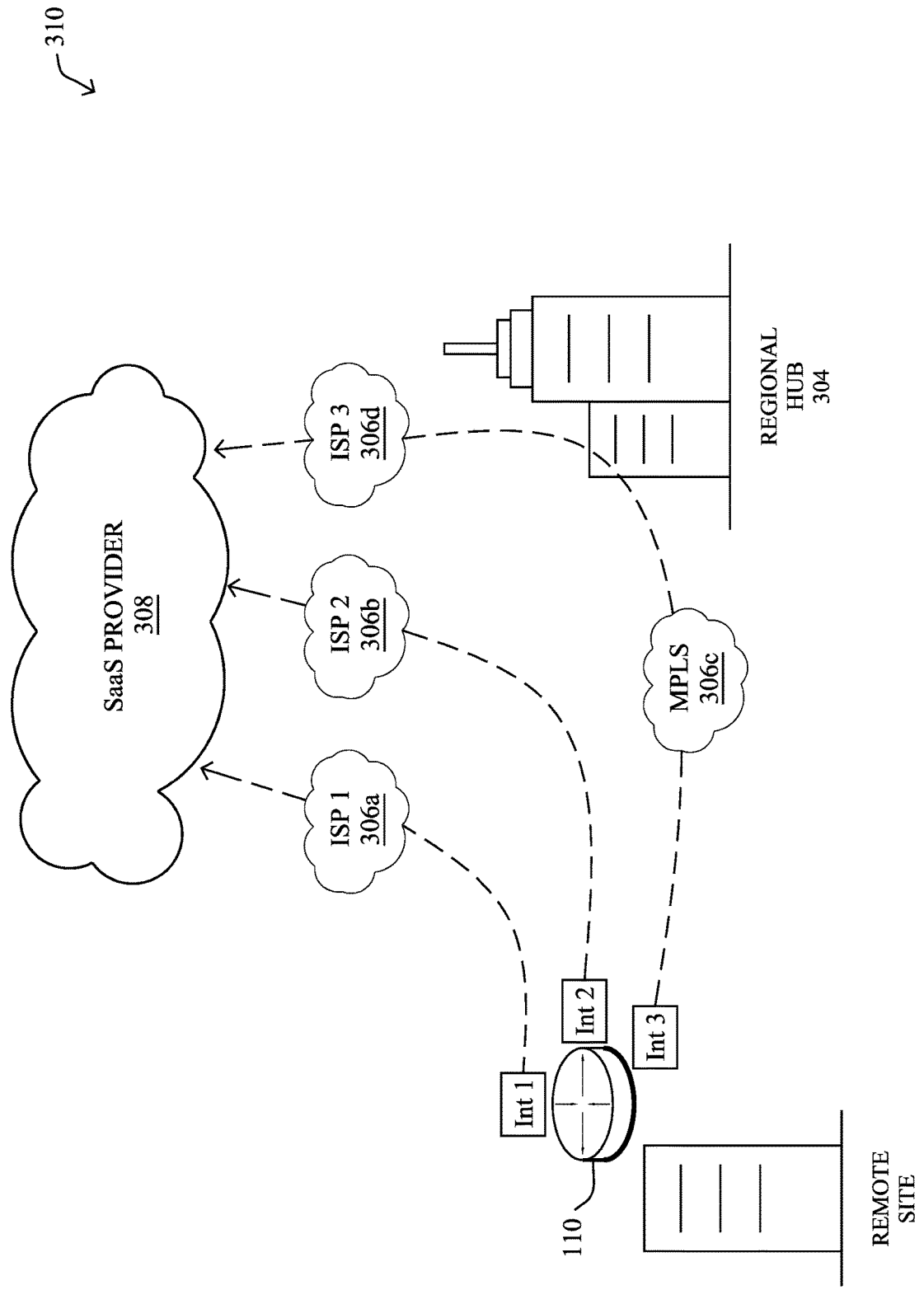

FIGS. 3A-3B illustrate example network deployments 300, 310, respectively. As shown, a router 110 (e.g., a device 200) located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider (s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
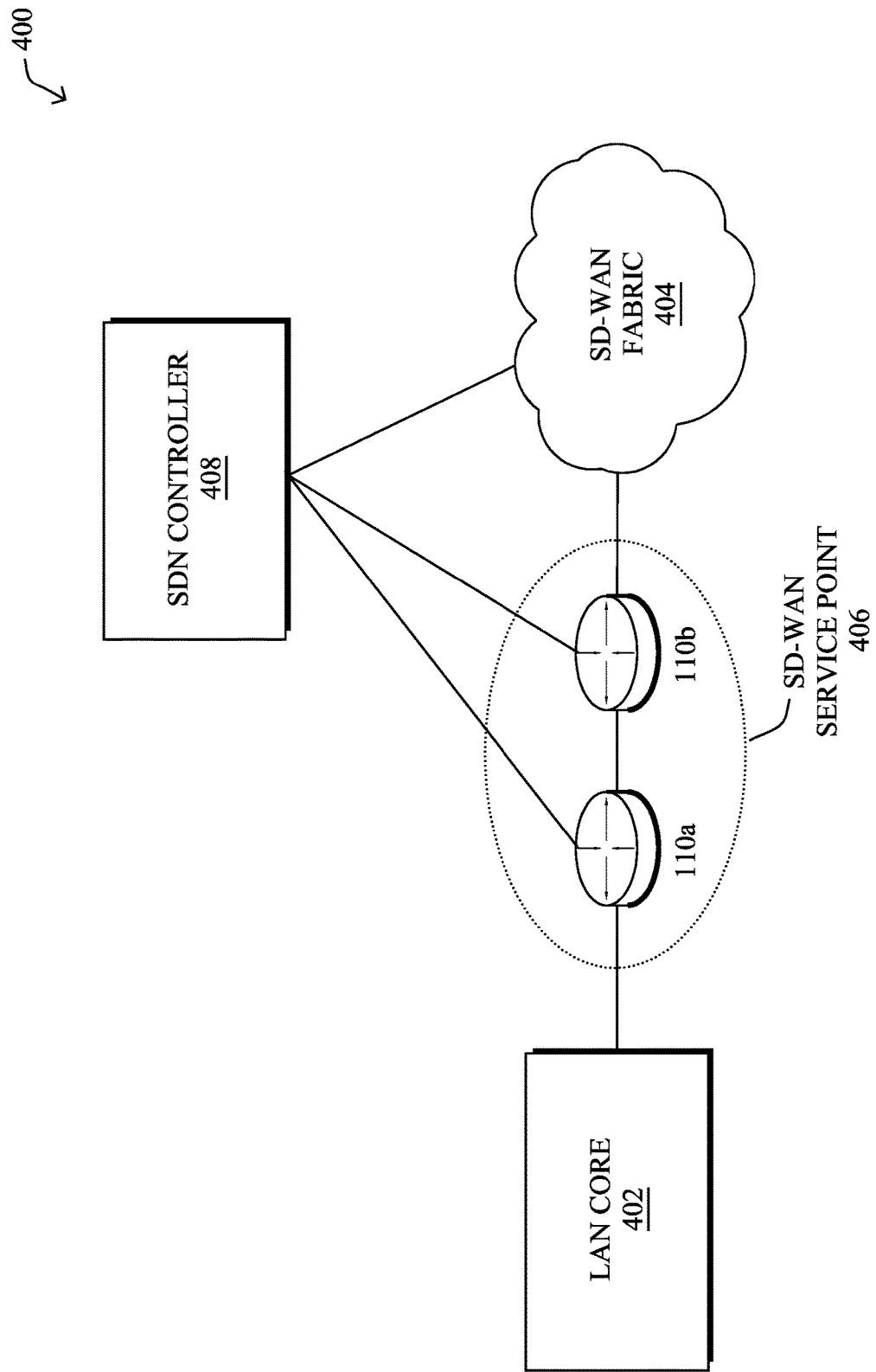
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., devices 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the QoE from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Application aware routing usually refers to the ability to rout traffic so as to satisfy the requirements of the application, as opposed to exclusively relying on the (constrained) shortest path to reach a destination IP address. Various attempts have been made to extend the notion of routing, CSPIP, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

In nous embodiments, predictive application aware routing can be used to identify which traffic should be shifted from one route to another so as not to violate the SLA of the application. For instance, routing process 244 may receive telemetry data from the various paths in the SD-WAN (e.g., measurements such as loss, jitter, delay, throughput, etc.) and predict when the current path on which application traffic is routed will violate the SLA of the application. In turn, this allows routing process 244 to re-route the application traffic in advance of the predicted SLA violation.

Another potential function of a predictive application aware routing approach is the formulation of different routing policies, based on the predictions. For instance, some routing policies may only need to be triggered during certain time period, e.g., "turn on routing policy P from time t1 to t2, when the route is better." This may lead to a scenario where multiple policies need to be enforced. In addition, the predictive routing mechanism may suggest new routing policies, as time goes on. Left unchecked, this can lead to the various routing policies becoming unmanageable, inconsistent, and unusable.

Scoring Policies for Predictive Routing Suggestions

The techniques herein introduce a routing policy patching system to manage, validate, schedule, and/or monitor the routing patches provided by a predictive routing mechanism. In some aspects, the techniques herein may consider both routing policies preconfigured by administrators, as well as routing policies automatically recommended by the predictive routing mechanism. In further aspects, the techniques herein may monitor the effectiveness of the various policies. In yet another aspect, the techniques herein may use machine learning and/or statistics to provide insights into which policies perform the best and which policies could have performed better. Such insights are valuable to an administrator, to enable the right policies in the future.

Illustratively, the techniques described herein may be performed by hardware, software, and/or firmware, such as in accordance with the routing policy management process 248, which may include computer executable instructions executed by the processor 220 (or independent processor of interfaces 210) to perform functions relating to the techniques described herein (e.g., in conjunction with routing process 244).

Specifically, according to various embodiments, a device makes a determination that a first predictive routing policy generated by a predictive routing engine for a network would have performed better than a preexisting routing policy that is active in the network. The device adjusts, based on the determination, a level of trust associated with the predictive routing engine. The device obtains information regarding a second predictive routing policy generated by the predictive routing engine for the network. The device activates the second predictive routing policy in the network, based on the level of trust associated with the predictive routing engine.

Figure 4B:
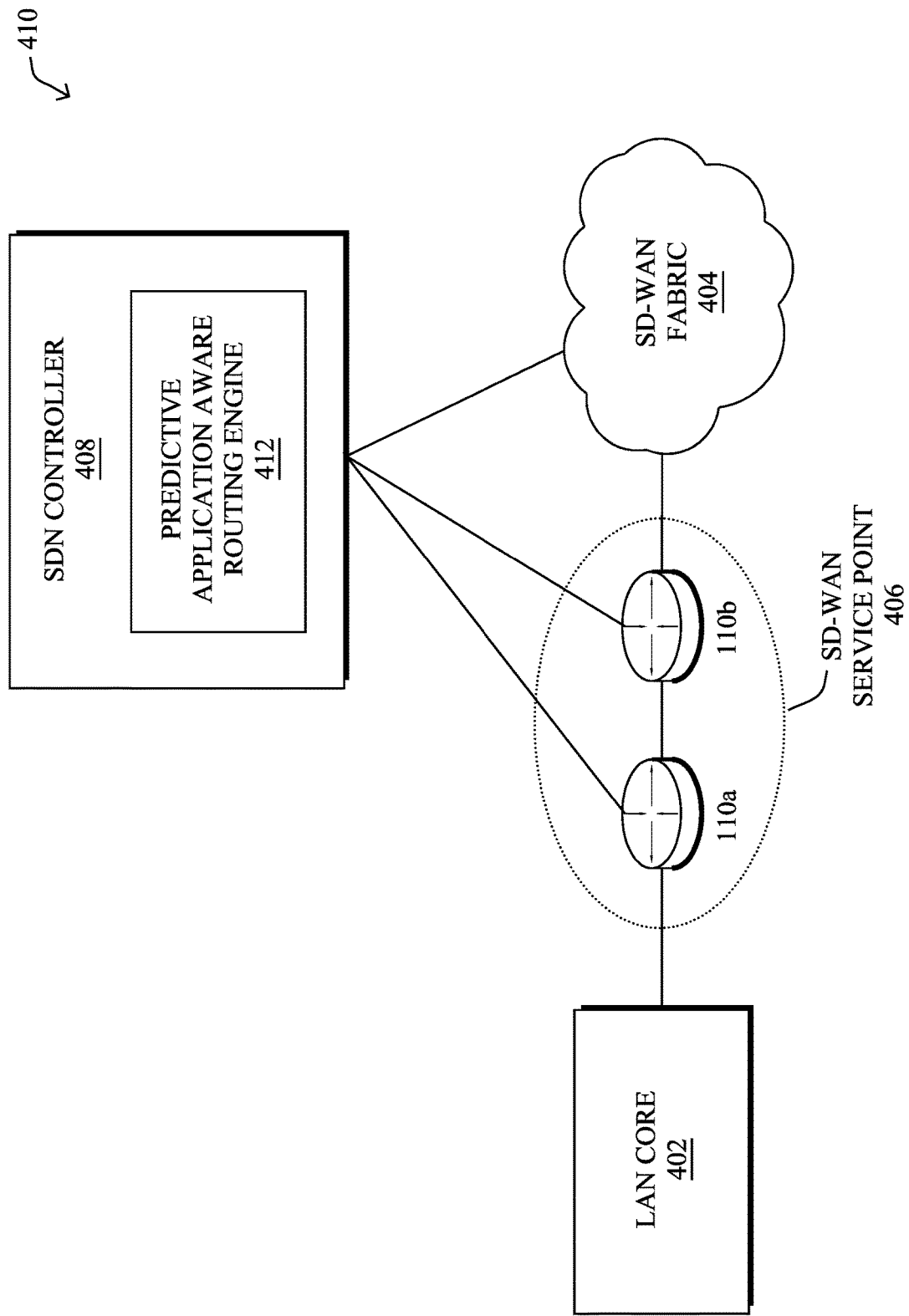

Operationally, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of process 244 and/or process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. From such decisions, predictive application aware routing engine 412 may recommend routing policies based on its predictions.

Figure 5:
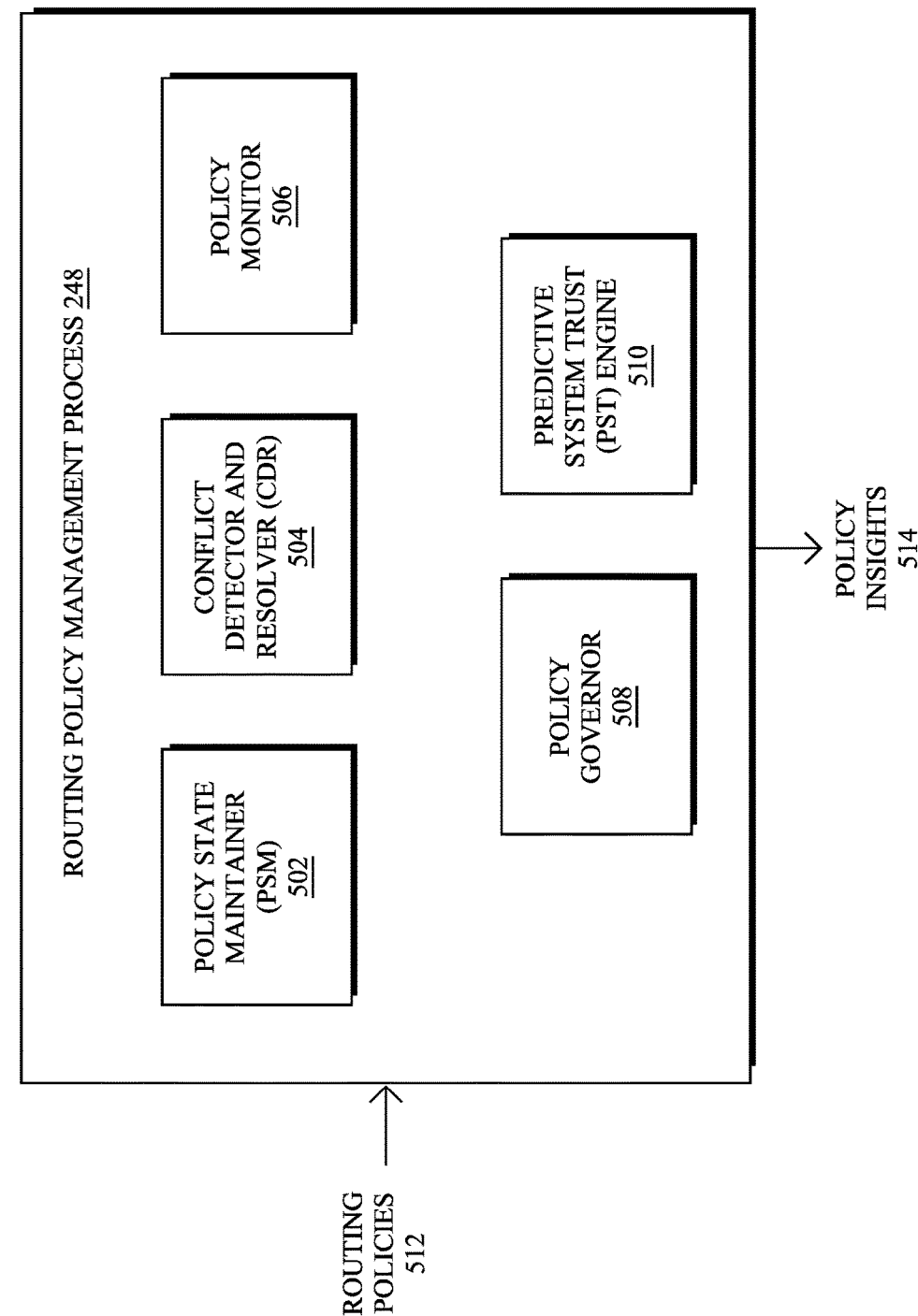
FIG. 5 illustrates an example architecture for evaluating routing policies.

FIG. 5 illustrates an example architecture 500 for evaluating routing policies, according to various embodiments. As shown, routing policy management process 248 may include any or all of the following components: a policy state maintainer (PSM) 502, a conflict detector and resolver (CDR) 504, a policy monitor 506, a policy governor 508, and/or a predictive system trust (PST) engine 510. As would be appreciated, the functionalities of these components may be combined or omitted, as desired. In addition, these components may be implemented on a singular device or in a distributed manner, in which case the combination of executing devices can be viewed as their own singular device for purposes of executing routing policy management process 248.

To better illustrate the techniques herein, the following terms are used:

A routing policy generally refers to a set of one or more rules regarding how to route application traffic from a set of one or more source routers to one or more destination(s) via some next-hop, potentially for a specific period of time. The source router(s) and destination(s) may each have their own IP addresses or classes of IP addresses (e.g., A.B.C.*).

Preconfigured policies generally refer to routing policies that are either default policies on the system or were configured by an administrator, such as manually or using some tool.

Predictive policies generally refer to those routing policies recommended by a predictive routing engine, such as predictive application aware routing engine 412 shown previously in FIG. 4B.

In various embodiments, routing policy management process 248 may include policy state maintainer (PSM) 502 that is responsible for tracking all routing policies 512 for the network, such as preconfigured policies and predictive policies. During execution, PSM 502 functions as a lookup table to track which policy 512 is triggered at different times. To search or update the policy, PSM 502 may utilize an IP lookup data structure, such as a PATRICIA trie, level compressed (LC) trie, or the like. This allows for efficient searching of next-hops for a given source and destination IP address.

In addition to maintaining routing IP lookup tables, PSM 502 may also keep track of when to trigger routing policies 512. This is due to the fact that the predictive routing engine may also recommend when to enable and disable a specific policy, based on its predictions regarding the state of the routes. For instance, the predictive routing engine may recommend turning on a routing policy P that enables the use of MPLS links only from 10:00 AM to 4:00 PM on weekdays.

Figure 6:
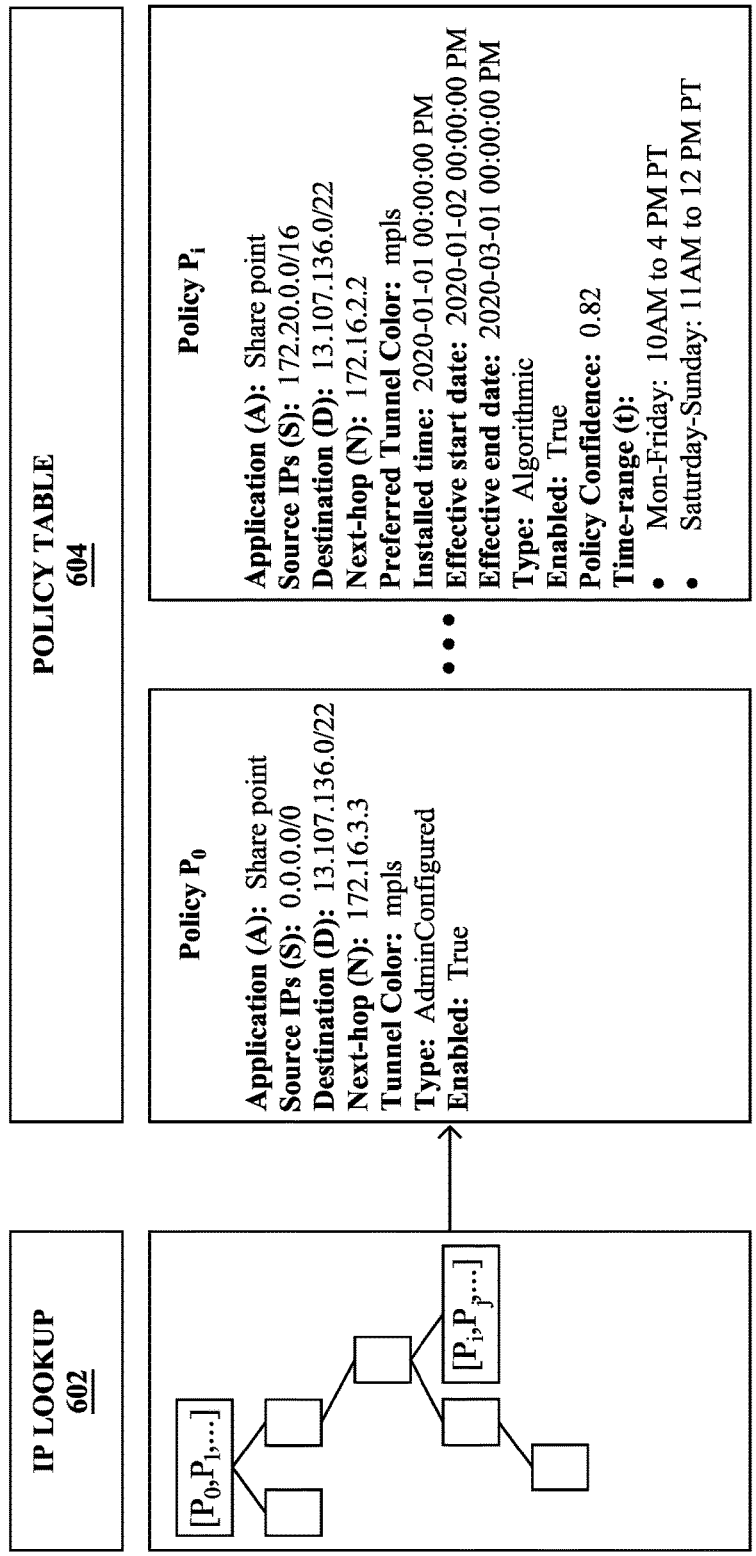
FIG. 6 illustrates an example of a lookup table to track routing policies.

To illustrate the operation of PSM 502, FIG. 6 shows an example 600 of the data structures that PSM 502 may maintain, in some embodiments. As shown, PSM 502 may maintain an IP lookup table 602, which may take the form of a trie, in some instance. In addition, PSM 502 may also maintain a policy table 604 that stores routing policies 512, such as a first policy $P_0$ through $i^{th}$ policy $P_1$. In various embodiments, policy table 604 may store any or all of the following:

The application associated with the routing policy
The source IP address(es)
The destination IP address(es)
The address of the next-hop
Preferred tunnel color
Policy meta-information: This may include the date when the policy was installed, the start and end dates for the policy effectiveness, the type of policy, etc. For instance, the type of the policy may specify whether the policy is a preconfigured policy or a predictive policy. If the policy is an predictive policy, the generating engine may also provide a confidence value for storage in policy table 604 that can be used for policy selection, in case of policy conflicts.
Time-range: If the policy is a predictive policy, then the entry for the policy may also indicate the time period(s) during which the policy should be enforced/active. Note that predictive policies may only be enabled temporarily for a limited time-period and may not be used as permanent policies, when first injected.
Enabled: The entry for a policy in policy table 604 may also indicate whether the current policy is currently enabled or disabled. Note that policy table 604 may track multiple routing policies recommended by the predictive routing engine, but that only a few policies may be enabled during a given time period, such as h CDR 504. Other policies may be present in policy table 604 only for purposes of evaluating their effectiveness, were they enabled.
Type of receiving networking gear: This policy attribute may also be stored in policy table 604 to identify the type(s) of networking equipment to which the policy may be applied.

Referring again to FIG. 5, PSM 502 may track changes to its policy table and the individual routing policies. In one embodiment, PSM 502 may also maintain a timeseries of changes to its policy table. Using the timeseries, PSM 502 may roll back a current policy change, if the system performance degrades or if an administrator explicitly disables or deletes a policy.

According to various embodiments, another potential component of routing policy management process 248 may be conflict detector and resolver (CDR) 504 to which a new routing policy 512 may be submitted for review. Such a routing policy 512 may be engine-generated by a predictive routing engine or a new, preconfigured policy defined by an administrator. Details regarding the new routing policy 512 may be conveyed, for instance, via a custom policy addition request message that requests review of the new routing policy 512 by CDR 504. In some embodiments, CDR 504 may assess the new routing policy 512, to determine whether it conflicts with any existing routing policies in the policy table maintained by PSM 502 by comparing the new routing policy 512 with the policy table entries. For instance, CDR 504 may determine that there is a conflict when the new routing policy 512 would affect the same traffic or path at the same time as that of another routing policy.

In one embodiment, CDR 504 may first identify such a conflict by performing an IP lookup for conflicting policies via PSM 502. In turn, for each policy found, CDR 504 may perform validation checks to identify certain types of conflicts, such as override conflicts, temporal conflicts, or the like. In cases in which CDR 504 detects a policy conflict, CDR 504 may also determine a resolution to the conflict, in various embodiments. Then, CDR 504 may provide the resolution as a suggestion to an administrator, such as via policy insights 514.

In general, some routing policies can be marked by an administrator as not overridable, in some embodiments. For example, an administrator may configure a non-overridable policy that gateway IP3 via MPLS tunnel is the next-hop for all voice traffic egressing from IP1 to IP2. If the predictive routing engine then suggests a new policy that would instead route the traffic via an Internet tunnel, this validation by CDR 504 would detect such an override conflict.

On detecting an override conflict, CDR 504 may record the conflict and indicate to policy governor 508 that the new policy is not enforceable because it would conflict with a non-overridable policy. In turn, policy governor 508 may report the conflict to an administrator and/or back to the predictive routing engine via policy insights 514. For instance, policy insights 514 may include a "policy conflict" message, which can be used for purposes of developing long-term strategies to accommodate or avoid such policies.

CDR 504 may also assess a new routing policy 512 for temporal conflicts. Indeed, in some instance, the new routing policy 512 may utilize a different route for an overlapping period of time as that of an existing routing policy. For example, consider a routing policy for a given application, source, destination, and gateway. If the new policy P1 recommends that the traffic should be routed via MPLS from 10:00 AM to 4:00 PM and another policy P2 recommends that the same traffic should be routed via the Internet from 2:00 PM to 5:00 PM on the same day, then there is a temporal conflict.

In one embodiment, CDR 504 may identify a temporal conflict using an Interval Tree. Under such an approach, CDR 504 may first insert the start and end time for each policy into an interval tree, which could be stored by PSM 502. When a new routing policy 512 is received, CDR 504 could then query the interval tree to identify any policy that conflict with the new routing policy 512, temporally.

To resolve any temporal conflicts, CDR 504 may first record the conflict event(s). In one embodiment, CDR 504 may then attempt to resolve a temporal conflict based on the "policy confidence" of the conflicting policy. For instance, continuing the above example, if the policy confidence policy P1 is greater than that of P2, then CDR 504 may opt to enforce policy P1 during its associated time periods, but then switch over to policy P2 for enforcement during any time periods that are not covered by P1. In another embodiment, CDR 504 may instead opt to junk policy P2, since enforcing it would cause another disruption (e.g., changing the route one additional time), which may affect the user experience of the application. In this instance, a new "policy conflict" message may be sent via policy insights 514 that includes the reasoning for the junking of policy P2. The user or predictive routing engine may then opt to go with this recommendation or resubmit the policy (e.g., with modifications).

Another potential component of routing policy management process 248 may be policy monitor 506, which is responsible for assessing the performance of the routing policies. In various embodiments, policy monitor 506 may do so for both active and inactive routing policies, with a goal of tracking how each active policy performs when enforced and how each inactive policy performs, had it been enforced. Such information can be used to provide greater insight into which policy would have served the system and users better.

Policy monitor 506 may perform its assessment of a routing policy by first fetching the list of all paths that are part of the policy from PSM 502. PSM 502 may also return health data regarding those paths (e.g., loss, latency, jitter, etc.) of the above paths to policy monitor 506. This heath data can be pulled by PSM 502 from a data lake of telemetry measurements, PSM 502 may subscribe to a continuous feed for the path health metrics from a message queue such as Apache Kafka, or the like.

In some embodiments, policy monitor 506 may utilize machine learning or statistical techniques to evaluate the performance of a path. If the path is active, then the performance can be readily quantified since the health data for that path is already available. If the path is inactive, however, policy monitor 506 can still estimate the performance of the path.

In one embodiment, policy monitor 506 may utilize an SLA to quantify the path performance. To do so, policy monitor 506 may examine a set of standard or administrator-configured SLA templates. For example, one such SLA violation template may be a voice-video template which may specify that the SLA is violated when the path exhibits loss<3%, delay<150 ms, etc.

Optionally, policy monitor 506 may compare the performance of the new path being used as a result of the currently-applied routing policy to the path performance before the routing policy was applied, so as to measure the potential performance improvement (PI). For example, if the objective is to avoid an SLA violation, PI may be a simple Boolean value (e.g., indicating whether the policy reduces the percentage of SLA violations by X %), or may be expressed in terms of network characteristics (e.g., comparing the distribution of a given performance metric along the old and new path). In yet another embodiment, policy monitor 506 may record the accuracy of the prediction, in addition to the performance impact of enforcing a given policy. Even if the new path improves the performance (or does not degrade performance), this may be useful to determine whether the prediction leading to the enforcement of the new policy was indeed correct, in another embodiment.

In addition, policy monitor 506 may compute any SLA violations for both active and inactive policies. This provides a mapping of the number of hours of SLA violation for each path, whether active or not. Policy monitor 506 may then use statistical techniques to quantify which paths performed the best. Policy monitor 506 may compute any of several metrics to quantify the effectiveness of a path. A simple approach is to count the hours of SLA violations for all paths and utilize this metric to rank the paths. In another embodiment, policy monitor 506 may compare the distribution of SLA violation hours over a certain timeframe (e.g., hour, day, week, etc.) using techniques such as the Kolmogorov-Smirnov (KS)-test, Earth Mover's Distance (EMD), Cramer-Von Mises test, or the like, to check whether one path is significantly better than the other in terms of SLA violation.

In another embodiment, policy monitor 506 may determine whether the current path recommended by the routing policy under scrutiny is better than the alternative path that would have been taken, otherwise. For example, policy monitor 506 may deem a path as significantly better if the current path is x ms lesser in terms of delay and/or y % lesser in terms of loss and/or z ms lesser in terms of jitter than the other path. Similar techniques as above can be utilized to quantify of the current path was better.

Policy monitor 506 may then store the results of its analysis in a data lake that can be queried by the other components of routing policy management process 248.

Another potential component of routing policy management process 248 is policy governor 508, which is responsible for analyzing the long-term policy recommendations based on the insights from policy monitor 506 and the conflicts detected by CDR 504. In one embodiment, policy governor 508 may display to an administrator all the better performing paths and/or routing policies that were not enabled due to CDR 504 identifying a conflict with a non-overridable policy set by the administrator. In this case, policy governor 508 may query policy monitor 506 to provide all the better paths for all pre-existing, non-overridable paths, rank them, and display them to the administrator via policy insights 514. This allows the administrator to decide whether to change the non-overridable policy, such as by allowing it to be overridden or disabling the policy, entirely.

In another embodiment, policy governor 508 may prompt the administrator to try out the new policy for some time (e.g., during a trial period) and revisit afterwards, should the new policy to better performance. In such a case, policy governor 508 may update PSM 502 of the temporary decision. In turn, PSM 502 may enable the temporary overriding of the existing policy during the trial period (e.g., by setting the entry for that policy to allow it to be overridden and then setting the entry back after expiration). On completion of the trial period, policy governor 508 may again present the statistics of the paths to the administrator. The administrator can then opt to extend the trial period, junk the new routing policy, or keep the new routing policy.

A further component of routing policy management process 248 may be predictive system trust (PST) engine 510 that is responsible for comparing the preconfigured policies and the predictive routing policies 512. This helps to facilitate the system to transition from classical rule-based policies to machine learning-driven predictive policies, if the predictive policies perform better. While policy governor 508 evaluates individual policies, PST engine 510 evaluates the effectiveness of the predictive algorithm itself. In various embodiments, PST engine 510 may do so leveraging a notion of trust. Indeed, many administrators may be hesitant to rely on an automated system to make changes. As explained later, PST engine 510 may build on varying trust levels based on the efficiency of the machine learning-based rules.

In one embodiment, PST engine 510 may split the routing policies 512 into the preconfigured policies and the predictive policies that are learned from violations observed in the past to forecast violations and suggest proactive re-routes. From a high level, PST engine 510 may function to make these two groups of routing policies 512 compete against one another for control of the network. The competition is driven by the past performance of both categories. As an example, PST engine 510 may measure the performance of both approaches based on the number of minutes or sessions of traffic effectively or potentially saved by each. For every saved minute or session, PST engine 510 may credit that approach with a certain number of points. Then, on reaching a certain number of points, PST engine 510 may 'upgrade' that approach to another level of trust. Note that the pre-configured policies may be very simplistic in nature, such as routing traffic onto the same WAN interface under any circumstances.

PST engine 510 may then evaluate the performance of each set of routing policies 512 and act as an arbiter between the two approaches and determine which one is more reliable in a given situation. Such a competition may be based on the past performance of each approach.

At first, PST engine 510 may assume that the predefined routing policies 512 are the most trustworthy. Soon, the predictive routing engine may begin forecasting issues and proactively suggest re-routing certain traffic. The enforcement of such proactive routing policies 512 suggested by the predictive routing engine may, in various embodiments, be based on their associated level of trust (e.g., the level of trust that PST engine 510 has assigned to the predictive routing policies 512 generated by the predictive routing engine). By way of example, consider the case in which PST engine 510 uses three distinct levels of trust:

Level-1: at this level, the category of routing policies 512 is never trusted and are never enforced, treating them more as suggestions. However, they are still tracked and evaluated by routing policy management process 248. For instance, when the predictive routing engine first begins to operate, its resulting predictive routing policies may be assigned this level of trust. In cases in which these policies would have realized some savings or other performance improvement, PST engine 510 may credit the category of policies with a certain amount of points.

Level-2: at this level, the system may trust routing policies 512 of either category for some suggestions, mostly to validate that they translate into actual savings or other performance improvements, when implemented.

Level-3: at this level, the system trusts the category of routing policies 512, systematically.

More levels could be added depending on the implementation, and the trust levels could also be further differentiated by type of application, network location, or the like. For instance, the predictive routing policies 512 could be at Level-2 for voice disruptions, but only at Level-1 for Office 365 disruptions. Similarly, trust levels can be differentiated by network locations, such that the predictive routing policies are at Level-1 in some countries or some buildings and at Level-3 for other locations. In other words, PST engine 510 may essentially quantify the level of trust the system has with respect to the predictive routing engine and the routing policies that it generates.

By way of example of the competition between the two categories of routing policies 512, assume that the predictive routing policies 512 are initially at Level-1 with zero points and the predefined rules are at Level-3 with N-number of points. In this case, PST engine 510 never trusts the predictive routing policies 512 and treats them as suggestions. However, their performance will still be tracked, to assess whether they could have realized some savings. For instance, when an SLA violation is forecasted successfully, the number of points credited to the predictive routing policies 512 may depend on the savings in terms of minutes or sessions compared to the decision made by the active predefined rules. If the predefined rules resulted in the same decision X-number of minutes after the proactive re-route that would have occurred had the predictive rule been enforced, thus impacting Y-number of sessions, PST engine 510 may credit a number of points proportional to X and/or Y to the predictive routing policies 512. Conversely, if the proactive re-route suggested by the predictive routing engine was an incorrect forecast (e.g., it would have resulted in an SLA violation, etc.), then PST engine 510 may credit more points to the predefined routing policies 512 such that PST engine 510 will trust it more in the future.

If the predictive routing policies 512 consistently outperform the predefined routing policies 512 in principle (i.e., without actually re-routing the traffic, but through evaluation after the fact), they will eventually accumulate enough points to reach Level-2. At this point, PST engine 510 may start trusting some of the predictive routing policies 512 in practice (i.e., actually implementing some of them in the network). If the benefits of the predictive routing policies 512 are confirmed by PST engine 510 in this phase, they, will eventually reach Level-3 and supersede completely the predefined routing policies 512, either globally or for certain types of traffic, such as for certain applications or locations of the network.

A key aspect of the above approach is that the predictive routing engine can leverage the assessments made by routing policy management process 248 to improve its predictions, particularly while its resulting policies rare still at Level-1 and Level-2. For instance, if an SLA violation occurs on a (primary) path A, and the predefined routing policy triggers a reroute of all traffic onto a backup path B, which causes an even worse SLA violation (i.e., the traffic itself is causing the SLA violation in this case), then the predictive routing engine may learn that rerouting to path B is not a good idea. Next time, the predictive routing engine will not suggest a reroute while the active, predefined routing policy 512, being rule-based, will make the same mistake, Consequently, the predictive routing policies 512 will accumulate more points. At some point, PST engine 510 will start trusting the predictive routing engine for this type of decisions on this path.

In various embodiments, PST engine 510 may also provide information regarding its trust scoring as part of policy insights 514. This allows, for instance, an administrator to review the current levels of trust and scoring by PST engine 510 and make any, adjustments as they see fit. For instance, the administrator may downgrade the predictive routing policies 512 made by the predictive routing engine to a lower trust level or promote them to a higher trust level, manually.

Figure 7:
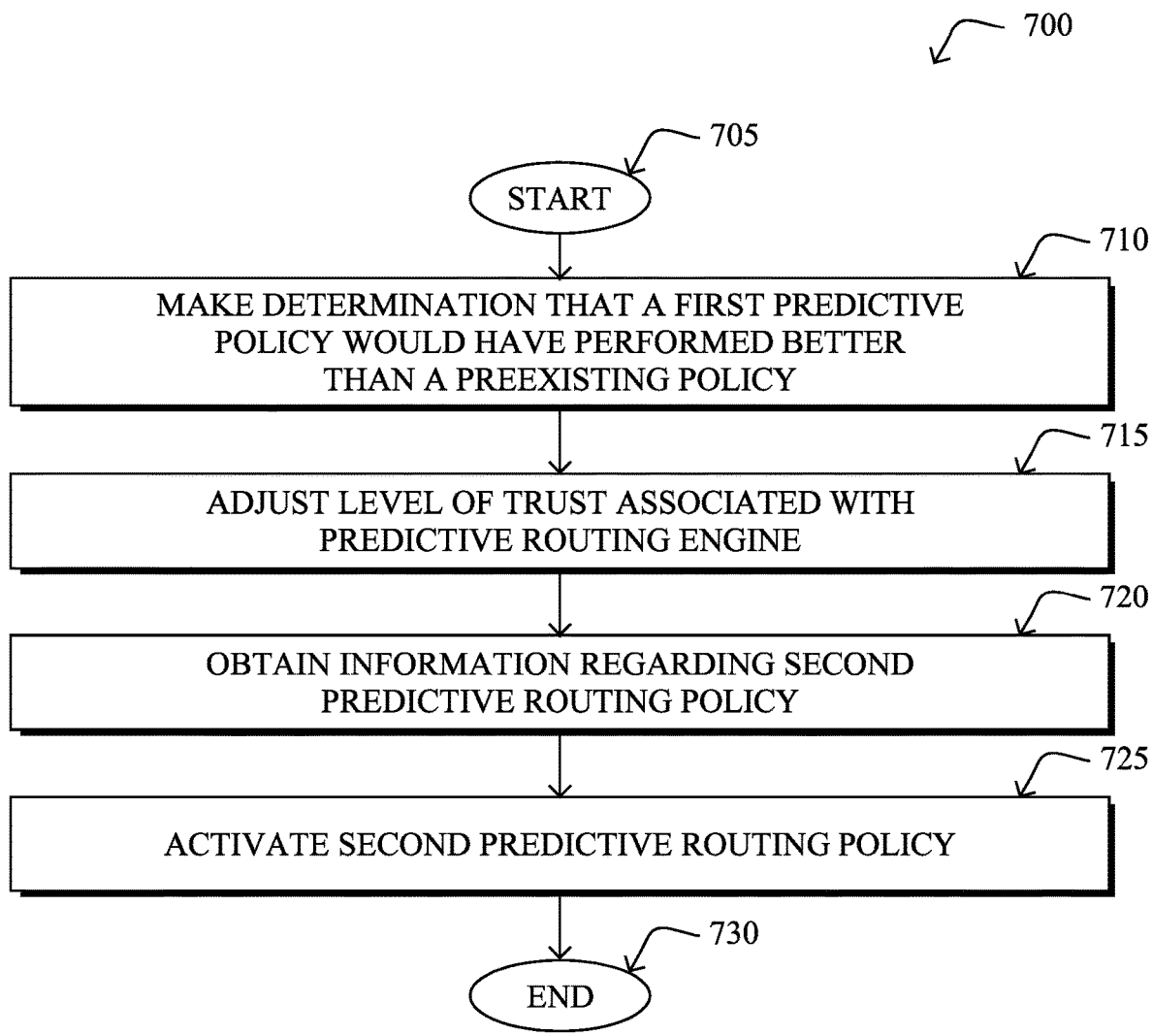
FIG. 7 illustrates an example simplified procedure for managing routing policies in a network.

FIG. 7 illustrates an example simplified procedure for managing routing policies in a network, in accordance with one or more embodiments described herein. For example, a non-generic, specifically configured device (e.g., device 200), such as an (SDN) controller, router, or the like, may perform procedure 700 by executing stored instructions (e.g., process 248). The procedure 700 may start at step 705, and continues to step 810, where, as described in greater detail above, the device may make a determination that a first predictive routing policy generated by a predictive routing engine for a network would have performed better than a preexisting routing policy that is active in the network. In some embodiments, the preexisting routing policy may be a user-defined or default routing policy, whereas the first predictive routing policy may be generated by the predictive routing engine using one or more machine learning models. In various embodiments, the device may make the determination by determining that a SLA violation occurred as a result of the preexisting policy and determining that the SLA violation would not have occurred had the first predictive routing policy been active in lieu of the preexisting routing policy. In further embodiments, the device may make the determination based on measured performance metrics from the network (e.g., delay, jitter, loss, etc.) for the routing paths.

At step 715, as detailed above, the device may adjust, based on the determination, a level of trust associated with the predictive routing engine. In various embodiments, there may be various levels of trust that can potentially be assigned to the predictive routing engine, ranging from not trusted at all to fully trusted. For instance, in one embodiment, the device may increase the level of trust from a level that prevents activation of any predictive routing policies generated by the predictive routing engine in the network to a level that allows automatic activation of at least some predictive routing policies generated by the predictive routing engine. A further increase in the level of trust may make all policies from the predictive routing engine eligible for activation in the network.

At step 720, the device may obtain information regarding a second predictive routing policy generated by the predictive routing engine for the network, as described in greater detail. For instance, once the predictive routing engine has generated a new predictive routing policy, it may send information regarding that policy for storage by the device. Such information may indicate, for example, the source and destination associated with the policy, the time period(s) during which the policy should remain active in the network, meta information regarding the policy, and the like.

At step 725, as detailed above, the device may activate the second predictive routing policy in the network, based on the level of trust associated with the predictive routing engine. In one embodiment, the device may first determine whether a temporal conflict exists between the second predictive routing policy and any routing policies already active in the network. If so, the device may resolve a temporal conflict between the second predictive routing policy and a particular routing policy, based on the second predictive routing policy having a higher confidence score than that of the particular routing policy, by activating the particular routing policy only at times outside of a time period during which the second predictive routing policy is active. In another embodiment, the device may first determine whether the second predictive routing policy would override a non-overridable routing policy already active in the network. In yet another embodiment, the device may first receive, via a user interface, an instruction to activate the second predictive routing policy in the network during a trial period, such that the second predictive routing policy is activated temporarily during the trial period. In addition, the device may roll back activation of the second predictive routing policy in the network, based on a determination that the second predictive routing policy degrades performance in the network. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for scoring routing policies for predictive routing suggestions. In some aspects, the techniques herein allow for the system to establish trust with a predictive routing engine before activating its policies directly in the network. By quantifying the effects of the policies and the level of trust, this also allows a network administrator to begin trusting automated decisions by the predictive routing engine. In further aspects, the techniques herein also allow for the system to handle conflicts between any routing policies generated by the predictive engine.

While there have been shown and described illustrative embodiments that provide for scoring routing policies for predictive routing suggestions, it is to be understood that various other adaptations and modifications may be made within the spirit and scope of the embodiments herein. For example, while certain embodiments are described herein with respect to using certain models for purposes of predicting failures or SLA violations, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
    making, by a device, a determination that a first predictive routing policy generated by a predictive routing engine for a network would have performed better than a preexisting routing policy that is active in the network;
    adjusting, by the device and based on the determination, a level of trust associated with the predictive routing engine;
    obtaining, by the device, information regarding a second predictive routing policy generated by the predictive routing engine for the network; and
    activating, by the device, the second predictive routing policy in the network, based on the level of trust associated with the predictive routing engine.

2. The method as in claim 1, wherein the network comprises a software-defined wide area network (SD-WAN).

3. The method as in claim 1, wherein adjusting the level of trust associated with the predictive routing engine comprises:
    increasing the level of trust from a level that prevents activation of any predictive routing policies generated by the predictive routing engine in the network to a level that allows automatic activation of at least some predictive routing policies generated by the predictive routing engine.

4. The method as in claim 1, further comprising:
    rolling back activation of the second predictive routing policy in the network, based on a determination that the second predictive routing policy degrades performance in the network.

5. The method as in claim 1, wherein making the determination that the first predictive routing policy generated by the predictive routing engine for the network would have performed better than the preexisting routing policy that is active in the network comprises:
 determining that a service level agreement violation occurred as a result of the preexisting routing policy; and
 determining that the service level agreement violation would not have occurred had the first predictive routing policy been active in lieu of the preexisting routing policy.

6. The method as in claim 1, wherein activating the second predictive routing policy in the network comprises:
 determining whether a temporal conflict exists between the second predictive routing policy and any routing policies already active in the network.

7. The method as in claim 6, wherein activating the second predictive routing policy in the network comprises:
 resolving a temporal conflict between the second predictive routing policy and a particular routing policy, based on the second predictive routing policy having a higher confidence score than that of the particular routing policy, by activating the particular routing policy only at times outside of a time period during which the second predictive routing policy is active.

8. The method as in claim 1, wherein activating the second predictive routing policy in the network comprises:
 determining whether the second predictive routing policy would override a non-overridable routing policy already active in the network.

9. The method as in claim 1, wherein activating the second predictive routing policy in the network, based on the level of trust associated with the predictive routing engine, further comprises:
 receiving, via a user interface, an instruction to activate the second predictive routing policy in the network during a trial period, wherein the second predictive routing policy is activated temporarily during the trial period.

10. The method as in claim 1, wherein the preexisting routing policy is a user-defined or default routing policy.

11. An apparatus, comprising:
 one or more network interfaces;
 a processor coupled to the one or more network interfaces and configured to execute one or more processes; and
 a memory configured to store a process that is executable by the processor, the process when executed configured to:
  make a determination that a first predictive routing policy generated by a predictive routing engine for a network would have performed better than a preexisting routing policy that is active in the network;
  adjust, based on the determination, a level of trust associated with the predictive routing engine;
  obtain information regarding a second predictive routing policy generated by the predictive routing engine for the network; and
  activate the second predictive routing policy in the network, based on the level of trust associated with the predictive routing engine.

12. The apparatus as in claim 11, wherein the network comprises a software-defined wide area network (SD-WAN).

13. The apparatus as in claim 11, wherein the apparatus adjusts the level of trust associated with the predictive routing engine by:
 increasing the level of trust from a level that prevents activation of any predictive routing policies generated by the predictive routing engine in the network to a level that allows automatic activation of at least some predictive routing policies generated by the predictive routing engine.

14. The apparatus as in claim 11, wherein the process when executed is further configured to:
 roll back activation of the second predictive routing policy in the network, based on a determination that the second predictive routing policy degrades performance in the network.

15. The apparatus as in claim 11, wherein the apparatus makes the determination that the first predictive routing policy generated by the predictive routing engine for the network would have performed better than the preexisting routing policy that is active in the network by:
 determining that a service level agreement violation occurred as a result of the preexisting routing policy; and
 determining that the service level agreement violation would not have occurred had the first predictive routing policy been active in lieu of the preexisting routing policy.

16. The apparatus as in claim 11, wherein the apparatus activates the second predictive routing policy in the network by:
 determining whether a temporal conflict exists between the second predictive routing policy and any routing policies already active in the network.

17. The apparatus as in claim 16, wherein the apparatus actives the second predictive routing policy in the network by:
 resolving a temporal conflict between the second predictive routing policy and a particular routing policy, based on the second predictive routing policy having a higher confidence score than that of the particular routing policy, by activating the particular routing policy only at times outside of a time period during which the second predictive routing policy is active.

18. The apparatus as in claim 11, wherein the apparatus activates the second predictive routing policy in the network by:
 determining whether the second predictive routing policy would override a non-overridable routing policy already active in the network.

19. The apparatus as in claim 11, wherein the preexisting routing policy is a user-defined or default routing policy.

20. A tangible, non-transitory, computer-readable medium storing program instructions that cause a device to execute a process comprising:
 making, by the device, a determination that a first predictive routing policy generated by a predictive routing engine for a network would have performed better than a preexisting routing policy that is active in the network;
 adjusting, by the device and based on the determination, a level of trust associated with the predictive routing engine;
 obtaining, by the device, information regarding a second predictive routing policy generated by the predictive routing engine for the network; and
 activating, by the device, the second predictive routing policy in the network, based on the level of trust associated with the predictive routing engine.

* * * * *

UNITED STATES PATENT AND TRADEMARK OFFICE
CERTIFICATE OF CORRECTION

PATENT NO. : 11,240,153 B1
APPLICATION NO. : 16/944334
DATED : February 1, 2022
INVENTOR(S) : Jean-Philippe Vasseur et al.

It is certified that error appears in the above-identified patent and that said Letters Patent is hereby corrected as shown below:

On the Title Page

Item (71), please replace as shown:
Applicant: Cisco Technology, Inc., San Jose, CA (US)

In the Specification

Column 8, Line 53, please amend as shown:
CSPF, link state routing protocols (ISIS, OSPF, etc.) using Column 8, Line 64, please amend as shown:
In various embodiments, predictive application aware rout- Column 11, Line 39, please amend as shown:
may be enabled during a given time period, such as by Column 16, Line 18, please amend as shown:
512 are confirmed by PST engine 510 in this phase, they Column 16, Line 36, please amend as shown:
mistake. Consequently, the predictive routing policies 512

Column 16, Line 44, please amend as shown:
510 and make any adjustments as they see fit. For instance, Signed and Sealed this
Seventeenth Day of May, 2022

Katherine Kelly Vidal
*Director of the United States Patent and Trademark Office*